United States Patent
Newman et al.

(10) Patent No.: US 11,790,488 B2
(45) Date of Patent: *Oct. 17, 2023

(54) METHODS AND APPARATUS FOR MULTI-ENCODER PROCESSING OF HIGH RESOLUTION CONTENT

(71) Applicant: GoPro, Inc., San Mateo, CA (US)

(72) Inventors: David Newman, Del Mar, CA (US); Daryl Stimm, Encinitas, CA (US); Adeel Abbas, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/332,953

(22) Filed: May 27, 2021

(65) Prior Publication Data

US 2021/0287337 A1 Sep. 16, 2021

Related U.S. Application Data

(63) Continuation of application No. 16/781,953, filed on Feb. 4, 2020, now Pat. No. 11,024,008, which is a
(Continued)

(51) Int. Cl.
*G06T 3/40* (2006.01)
*H04N 19/80* (2014.01)
*G06T 3/00* (2006.01)

(52) U.S. Cl.
CPC .......... *G06T 3/4038* (2013.01); *G06T 3/0018* (2013.01); *G06T 3/0062* (2013.01); *H04N 19/80* (2014.11)

(58) Field of Classification Search
None
See application file for complete search history.

(56) References Cited

U.S. PATENT DOCUMENTS 5,257,051 A 10/1993 Bushroe
5,703,701 A 12/1997 Yamamoto
(Continued)

FOREIGN PATENT DOCUMENTS

WO 2018236050 A1 12/2018

OTHER PUBLICATIONS

Jeppsson et al. "Efficient Live and on-Demand Tiled HEVC 360 VR Video Streaming," 2018 IEEE International Symposium on Multimedia (ISM), Taichung, 2018, pp. 81-88.
(Continued)

*Primary Examiner* — Peter D Le
(74) *Attorney, Agent, or Firm* — ESPLIN & ASSOCIATES, PC

(57) ABSTRACT

Methods and apparatus for multi-encoder processing of high resolution content. In one embodiment, the method includes capturing high resolution imaging content; splitting up the captured high resolution imaging content into respective portions; feeding the split up portions to respective imaging encoders; packing encoded content from the respective imaging encoders into an A/V container; and storing and/or transmitting the A/V container. In another embodiment, the method includes retrieving and/or receiving an A/V container; splitting up the retrieved and/or received A/V container into respective portions; feeding the split up portions to respective imaging decoders; stitching the decoded imaging portions into a common imaging portion; and storing and/or displaying at least a portion of the common imaging portion.

20 Claims, 7 Drawing Sheets

Related U.S. Application Data continuation of application No. 16/234,396, filed on Dec. 27, 2018, now Pat. No. 11,049,219, which is a continuation-in-part of application No. 15/982,945, filed on May 17, 2018, now abandoned.

(60) Provisional application No. 62/515,999, filed on Jun. 6, 2017.

(56) References Cited

U.S. PATENT DOCUMENTS

| | | | |
|---|---|---|---|
| 6,118,556 | A | 9/2000 | Yamamoto |
| 6,141,034 | A | 10/2000 | McCutchen |
| 6,373,895 | B2 | 4/2002 | Saunders |
| 7,835,437 | B1 | 11/2010 | Zhang |
| 8,055,974 | B2 | 11/2011 | Mizuno |
| 8,606,029 | B1 | 12/2013 | Wong |
| 9,172,924 | B1 | 10/2015 | Martel |
| 9,294,757 | B1 | 3/2016 | Thor |
| 9,721,393 | B1 | 8/2017 | Dunn |
| 9,787,862 | B1 | 10/2017 | Newman |
| 9,894,422 | B2 | 2/2018 | Hwang |
| 10,187,568 | B1 | 1/2019 | Tran |
| 10,321,109 | B1 | 6/2019 | Tanumihardja |
| 10,349,055 | B1* | 7/2019 | Waggoner ............ H04N 19/124 |
| 10,666,941 | B1 | 5/2020 | Doron |
| 11,004,176 | B1 | 5/2021 | Newman |
| 11,024,008 | B1 | 6/2021 | Newman |
| 11,049,219 | B2 | 6/2021 | Newman |
| 11,109,067 | B2 | 8/2021 | Newman |
| 11,228,781 | B2 | 1/2022 | Newman |
| 11,481,863 | B2 | 10/2022 | Macdonald |
| 2001/0036356 | A1 | 11/2001 | Weaver |
| 2002/0009151 | A1 | 1/2002 | Gentric |
| 2002/0097322 | A1 | 7/2002 | Monroe |
| 2002/0141659 | A1 | 10/2002 | Florin |
| 2002/0159632 | A1 | 10/2002 | Chui |
| 2003/0016289 | A1 | 1/2003 | Motomura |
| 2003/0048921 | A1 | 3/2003 | Cahill |
| 2003/0103678 | A1 | 6/2003 | Hsuan |
| 2003/0123857 | A1 | 7/2003 | Egawa |
| 2003/0206582 | A1 | 11/2003 | Srinivasan |
| 2004/0156548 | A1 | 8/2004 | Kodama |
| 2004/0158878 | A1 | 8/2004 | Ratnakar |
| 2004/0240856 | A1 | 12/2004 | Yahata |
| 2005/0044112 | A1 | 2/2005 | Yamamoto |
| 2005/0195899 | A1 | 9/2005 | Han |
| 2005/0265619 | A1 | 12/2005 | Ozaki |
| 2006/0001742 | A1 | 1/2006 | Park |
| 2006/0024041 | A1 | 2/2006 | Lou |
| 2006/0034523 | A1 | 2/2006 | Park |
| 2006/0256380 | A1 | 11/2006 | Klassen |
| 2007/0005795 | A1 | 1/2007 | Gonzalez |
| 2007/0065139 | A1 | 3/2007 | Ishii |
| 2007/0102520 | A1 | 5/2007 | Carlson |
| 2007/0253490 | A1 | 11/2007 | Makino |
| 2007/0274599 | A1 | 11/2007 | Ishikawa |
| 2007/0291115 | A1 | 12/2007 | Bachelder |
| 2008/0084926 | A1 | 4/2008 | Valenzuela |
| 2008/0101455 | A1 | 5/2008 | Scheelke |
| 2008/0129844 | A1 | 6/2008 | Cusack |
| 2008/0159594 | A1 | 7/2008 | Chiu |
| 2008/0225132 | A1 | 9/2008 | Inaguma |
| 2008/0252719 | A1* | 10/2008 | Choi ............ H04N 13/207 348/E13.001 |
| 2008/0259409 | A1 | 10/2008 | Nishizawa |
| 2009/0219282 | A1 | 9/2009 | Kim |
| 2010/0053212 | A1 | 3/2010 | Kang |
| 2010/0071010 | A1 | 3/2010 | Elnathan |
| 2010/0088646 | A1 | 4/2010 | Nishimori |
| 2010/0157018 | A1 | 6/2010 | Lampotang |
| 2010/0157090 | A1 | 6/2010 | Kobayashi |
| 2010/0169779 | A1 | 7/2010 | Mason |
| 2010/0271394 | A1* | 10/2010 | Howard ............ G06F 3/011 345/633 |
| 2010/0299630 | A1 | 11/2010 | Mccutchen |
| 2011/0010497 | A1 | 1/2011 | Bryant-Rich |
| 2011/0013849 | A1 | 1/2011 | Saito |
| 2011/0135000 | A1 | 6/2011 | Alshina |
| 2012/0086850 | A1 | 4/2012 | Irani |
| 2012/0128058 | A1 | 5/2012 | Bakharov |
| 2012/0163725 | A1 | 6/2012 | Fukuhara |
| 2012/0194685 | A1 | 8/2012 | Kawakami |
| 2012/0300984 | A1 | 11/2012 | Dann |
| 2013/0128121 | A1 | 5/2013 | Agarwala |
| 2013/0141572 | A1 | 6/2013 | Torres |
| 2013/0155250 | A1 | 6/2013 | Myers |
| 2013/0162766 | A1 | 6/2013 | Cohen |
| 2013/0166580 | A1 | 6/2013 | Maharajh |
| 2013/0195205 | A1 | 8/2013 | Wang |
| 2013/0198233 | A1 | 8/2013 | Jacobson |
| 2013/0198337 | A1 | 8/2013 | Nix |
| 2014/0119675 | A1 | 5/2014 | Kim |
| 2014/0133568 | A1 | 5/2014 | Otsuka |
| 2014/0165125 | A1 | 6/2014 | Lee |
| 2014/0192151 | A1 | 7/2014 | Wang |
| 2014/0218608 | A1 | 8/2014 | Stelliga |
| 2014/0267842 | A1 | 9/2014 | Lee |
| 2014/0347450 | A1 | 11/2014 | Han |
| 2014/0348248 | A1 | 11/2014 | Ihara |
| 2015/0163476 | A1 | 6/2015 | Grafulla-González |
| 2015/0187389 | A1 | 7/2015 | Horita |
| 2015/0222293 | A1 | 8/2015 | Lida |
| 2015/0319462 | A1 | 11/2015 | Ramasubramonian |
| 2015/0350682 | A1 | 12/2015 | Zhang |
| 2016/0073023 | A1 | 3/2016 | Rondinelli |
| 2016/0094847 | A1 | 3/2016 | Ibrahim |
| 2016/0103715 | A1 | 4/2016 | Sethia |
| 2016/0112489 | A1 | 4/2016 | Adams |
| 2016/0134881 | A1 | 5/2016 | Wang |
| 2016/0148431 | A1 | 5/2016 | Seydoux |
| 2016/0150241 | A1 | 5/2016 | Hirabayashi |
| 2016/0165309 | A1 | 6/2016 | Van Brandenburg |
| 2016/0261373 | A1 | 9/2016 | Nagasaka |
| 2016/0335484 | A1 | 11/2016 | Xie |
| 2016/0337706 | A1 | 11/2016 | Hwang |
| 2016/0360104 | A1 | 12/2016 | Zhang |
| 2016/0360295 | A1 | 12/2016 | Hwang |
| 2016/0373771 | A1 | 12/2016 | Hendry |
| 2017/0078574 | A1 | 3/2017 | Puntambekar |
| 2017/0094278 | A1 | 3/2017 | Bickerstaff |
| 2017/0118540 | A1 | 4/2017 | Thomas |
| 2017/0148186 | A1 | 5/2017 | Holzer |
| 2017/0155924 | A1 | 6/2017 | Gokhale |
| 2017/0195565 | A1 | 7/2017 | Ollier |
| 2017/0214861 | A1 | 7/2017 | Rachlin |
| 2017/0236252 | A1 | 8/2017 | Nguyen |
| 2017/0243384 | A1 | 8/2017 | Huang |
| 2017/0272758 | A1 | 9/2017 | Lin |
| 2017/0295373 | A1 | 10/2017 | Zhang |
| 2017/0302990 | A1 | 10/2017 | Ying |
| 2017/0336705 | A1 | 11/2017 | Zhou |
| 2017/0339341 | A1 | 11/2017 | Zhou |
| 2017/0366808 | A1 | 12/2017 | Lin |
| 2018/0027178 | A1* | 1/2018 | Macmillan ............ G06T 3/20 348/38 |
| 2018/0027181 | A1* | 1/2018 | Roulet ............ H04N 23/54 348/38 |
| 2018/0035047 | A1 | 2/2018 | Lei |
| 2018/0040164 | A1 | 2/2018 | Newman |
| 2018/0054695 | A1 | 2/2018 | Castor |
| 2018/0075635 | A1 | 3/2018 | Choi |
| 2018/0101931 | A1 | 4/2018 | Abbas |
| 2018/0103199 | A1 | 4/2018 | Hendry |
| 2018/0160160 | A1 | 6/2018 | Swaminathan |
| 2018/0184121 | A1 | 6/2018 | Kim |
| 2018/0190323 | A1 | 7/2018 | De Jong |
| 2018/0192074 | A1 | 7/2018 | Shih |
| 2018/0218484 | A1 | 8/2018 | Shen |
| 2018/0276800 | A1 | 9/2018 | Abbas |
| 2018/0288356 | A1 | 10/2018 | Ray |
| 2018/0343470 | A1 | 11/2018 | Schmit |
| 2018/0352245 | A1 | 12/2018 | Macdonald |
| 2019/0007669 | A1 | 1/2019 | Kim |

(56) References Cited

U.S. PATENT DOCUMENTS

| | | |
|---|---|---|
| 2019/0007676 A1 | 1/2019 | Katsumata |
| 2019/0035064 A1 | 1/2019 | Franklin |
| 2019/0104326 A1 | 4/2019 | Stockhammer |
| 2019/0158859 A1 | 5/2019 | Zhang |
| 2019/0213425 A1 | 7/2019 | Anderson |
| 2019/0222756 A1 | 7/2019 | Moloney |
| 2019/0230283 A1 | 7/2019 | Ollier |
| 2019/0235748 A1 | 8/2019 | Seol |
| 2019/0313026 A1 | 10/2019 | Cheng |
| 2019/0333237 A1 | 10/2019 | Javidnia |
| 2020/0014954 A1 | 1/2020 | Watson |
| 2020/0053392 A1 | 2/2020 | Hannuksela |
| 2020/0053393 A1 | 2/2020 | Niamut |
| 2020/0084428 A1 | 3/2020 | Oh |
| 2020/0092582 A1 | 3/2020 | Xiu |
| 2020/0107003 A1 | 4/2020 | Phillips |
| 2020/0250454 A1 | 8/2020 | Croxford |
| 2020/0351449 A1 | 11/2020 | Oh |
| 2020/0413086 A1 | 12/2020 | Newman |
| 2020/0413093 A1 | 12/2020 | Newman |
| 2021/0090214 A1 | 3/2021 | Newman |
| 2021/0125303 A1 | 4/2021 | Macdonald |
| 2021/0192796 A1 | 6/2021 | Aflaki Beni |
| 2021/0392375 A1 | 12/2021 | Newman |
| 2022/0060738 A1 | 2/2022 | Newman |
| 2022/0132144 A1 | 4/2022 | Sauer |

OTHER PUBLICATIONS

Qin et al., "On-Demand Sharing of a High-Resolution Panorama Video from Networked Robotic Cameras", Proceedings of the 2007 IEEE/RSJ International Conference on Intelligent Robots and Systems San Diego, CA, USA, Oct. 29-Nov. 2, 2007, 6 pages.

"3rd Generation Partnership Project; Technical Specification Group Services and System Aspects; Virtual Reality (VR) media services over 3GPP (Release 15)", 3GPP Standard ; Technical Report ; 3GPP TR 26.918, 3rd Generation Partnership Project (3GPP), Mobile Competence Centre ; 650, Route Des Lucioles ; F-06921 Sophia-Antipolis Cedex ; FRANCE, (May 3, 2017), vol. SA WG4, No. V0.7.0, pp. 1-58, XP051298214.

Hall; GPU Accelerated Feature Algorithms for Mobile Devices; Mar. 2014; School of Computing and Mathematical Sciences, Auckland University; pp. 1-150.

International Search Report and Written Opinion issued in PCT/US2019/68386, dated Mar. 20, 2020, 11 pages.

Paul Bourke; Converting a fisheye image into a panoramic, spherical or perspective projection; Jul. 2016 (25 pages).

Yuwen He et al, "JVET-D0021 (DOC). AHG8: InterDigital's projection format conversion tool", Joint Video Exploration Team (JVET). of ITU-T SG 16 WP 3 and ISO/IEC JTC 1/SC 29/WG 11. 4th Meeting: Chengdu, CN, Oct. 15-21, 2016, (Oct. 21, 2016), URL: http://phenix.int-evry.fr/jvet/doc_end_user/current_document.php?id=2717, (Oct. 29, 2019), XP055637250, 35 pages.

* cited by examiner

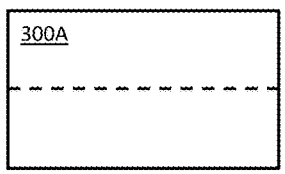
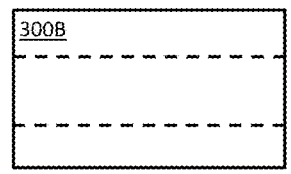
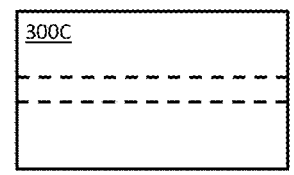
FIG. 3A          FIG. 3B          FIG. 3C

METHODS AND APPARATUS FOR MULTI-ENCODER PROCESSING OF HIGH RESOLUTION CONTENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

This disclosure relates to the encoding/decoding of high resolution content using extant video codecs. In one exemplary embodiment, a camera device can re-map natively captured images into projections that can be efficiently shared within popular video codec ecosystems. For example, natively captured fisheye images can be re-mapped into equal area cubic (EAC) projections that can be efficiently handled within commodity video codecs.

Description of Related Art

Imaging sensors, such as imaging sensors contained within image capture devices such as the GoPro Hero™ family of devices manufactured by the Assignee hereof, may natively capture imaging content (e.g., still images, video content, panoramic content) at a resolution and frame rate that is incompatible with many extant imaging codecs contained within many common computing devices (such as smart phones). Accordingly, many types of captured imaging content may not be processed at their natively captured resolutions and/or at their natively captured bit rates (e.g., frame rates). Accordingly, what is needed are methodologies and apparatus that enable the processing of high resolution imaging content at native resolutions and native bit rates using extant imaging codecs that are not well suited for these native resolutions and native bit rates.

SUMMARY

The present disclosure satisfies the foregoing needs by providing, inter alia, methods and apparatus for enabling the processing of high resolution imaging content.

In one aspect, a method for storing and/or transmitting image content is disclosed. In one embodiment, the method includes: capturing image content via one or more image capture apparatus; generating a projection from the image content; splitting up the projection into a plurality of image segments; encoding the plurality of image segments into a plurality of encoded data containers; and transmitting the plurality of encoded data containers.

In one variant, capturing the image content comprises capturing a plurality of fisheye images; and the generating the projection includes stitching the fisheye images into a spherical projection.

In another variant, generating the projection includes re-mapping the spherical projection into a cubic projection. In one such variant, re-mapping the spherical projection into the cubic projection is a lossless mathematical transform. In another such variant, splitting up the projection into a plurality of image segments includes: generating a first image segment from a subset of facets of the cubic projection; and generating a second image segment from a different subset of facets of the cubic projection.

In yet another variant, stitching the fisheye images into a spherical projection further includes generating a stitching metadata file. In one such variant, stitching the fisheye images into a spherical projection is lossy; and the stitching metadata file includes recovery information.

In another aspect, a camera apparatus is disclosed. In one embodiment, the camera apparatus includes: a plurality of image capture components; one or more encoding logic; a data interface; an image signal processor; and a non-transitory computer readable medium. In one exemplary embodiment, the non-transitory computer readable medium includes one or more instructions which when executed by the image signal processor is configured to: cause the plurality of image capture components to capture a plurality of images; stitch the plurality of images into a spherical projection; re-map the spherical projection into a cubic projection; split the cubic projection into two image segments; encode the two image segments via the one or more encoding logic into two encoded data containers; and transmit the two encoded data containers.

In one variant, the plurality of image capture components include a first fisheye camera and a second fisheye camera in a Janus-type configuration.

In another variant, the one or more encoding logic includes a first High Efficiency Video Coding (HEVC) codec supporting images not exceeding 4096 pixels in width and 2160 pixels in height. In one such variant, the cubic projection includes an equal area cubic (EAC) cubic projection characterized by six facets of 1344 pixels in width and 1344 pixels in height. In one further variant, the two image segments include 4032 pixels in width and 1344 pixels in height. In yet a further variant, each of the two image segments include a contiguous 2700 image.

In yet another variant, the re-map of the spherical projection into a cubic projection includes a lossless transform.

In yet another aspect, a post-processing device is disclosed. In one embodiment, the post-processing device includes: one or more decoding logic; a data interface; a processor; and a non-transitory computer readable medium. In one exemplary embodiment, the non-transitory computer readable medium includes one or more instructions which when executed by the processor is configured to: receive two encoded data containers; decode the two encoded data containers into two image segments via the one or more decoding logic; fast stitch the two image segments into a cubic projection; and re-map the cubic projection into a spherical projection.

In one variant, the one or more decoding logic includes a first High Efficiency Video Coding (HEVC) codec supporting images not exceeding 4096 pixels in width and 2160 pixels in height.

In another variant, the non-transitory computer readable medium further includes one or more instructions which when executed by the processor is configured to: receive stitching metadata; and recover at least one image from the spherical projection based on the stitching metadata.

In yet another variant, the spherical projection is characterized by a 5376 pixel horizon; and the non-transitory computer readable medium further includes one or more instructions which when executed by the processor is configured to: upscale the spherical projection to a 5760 pixel horizon. In one such variant, the post-processing device further includes: a user interface configured to select a view angle; and the non-transitory computer readable medium further includes one or more instructions which when executed by the processor is configured to: receive the view angle via the user interface; and generate a 1200 panorama from the spherical projection. In another such variant, the non-transitory computer readable medium further includes one or more instructions which when executed by the processor is configured to generate a 360 panorama from the spherical projection.

In yet another aspect, a non-transitory computer readable apparatus is disclosed. In one exemplary embodiment, the non-transitory computer readable apparatus includes one or more instructions which when executed by the processor is configured to: receive two encoded data containers; decode the two encoded data containers into two image segments via one or more decoding logic; fast stitch the two image segments into a cubic projection; and re-map the cubic projection into a spherical projection.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

FIGS. 3A-3C illustrate various ways for image splitting high resolution imaging content in accordance with some implementations.

Figure 1A:
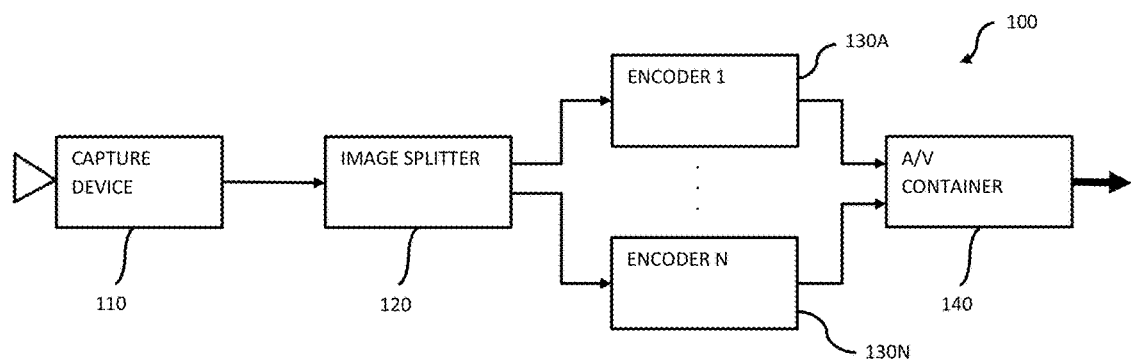
FIG. 1A illustrates a system for the capture and encoding of high resolution imaging content in accordance with some implementations.

All Figures disclosed herein are © Copyright 2017-2018 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

As a brief aside, existing video codec (encoding/decoding) infrastructure is standardized such that the various participants of the ecosystem (e.g., manufacturers, component vendors, customers, etc.) can interact without interoperability issues. For example, a High Efficiency Video Coding (HEVC) standard (also known as H.265 and/or MPEG-H Part 2 (Motion Picture Experts Group)) promulgates specific requirements for e.g., audio/visual (A/V) formats and data structures. Once the specific A/V formats have been published, codec manufacturers can create codecs that support the promulgated standards. In parallel, software developers can write software for cutting edge applications with confidence that their applications will correctly function in the newly designed hardware.

Even though the standardization process is seamless for large changes in functionality, subsequent revisions often have mixed adoption. Most hardware that is already deployed has "hardened" physical logic that cannot be changed; as a result modifications to hardware functionality can be very difficult. Manufacturing specialized hardware to support revisions to A/V formats can be very expensive; in some cases, many times more expensive than the commodity alternatives. In contrast, software is highly dynamic, and software features regularly track the whims of commercial markets. As a result, there is often significant pressure to implement new software features within the limitations of existing hardware deployments.

As but one example, an area of significant commercial interest is spherical video photography. One viewing format (made popular by the Assignee hereof) represents 1200 of viewing angle as a 1920×1080 (more commonly referred to as "1080p"). Notably, an A/V format that could represent a 360° panorama with 3×1920 (or 5760 pixels) could effectively provide a 1080p image for any viewing angle. Unfortunately, the widely deployed so-called "Level 5.2" HEVC codec can only support video formats of up to 4096×2160 pixels (also commonly referred to as "4K" video). Even though "Level 6" HEVC codecs can support much larger video formats up to 8196×4320 (also commonly referred to as "8K" video), the difference in pricing (and commercial deployment) between Level 5.2 and Level 6 HEVC codecs is substantial. Moreover, handling spherical video encoding/decoding in software is too slow for video applications.

To these ends, various embodiments of the present disclosure are directed to re-mapping media into A/V container formats that can fit within the limitations of existing commodity video codecs. In one exemplary embodiment of the present disclosure, an action camera can perform an "in-camera" stitch to encode a spherical video as an equal area cubic (EAC) projection. The EAC projection can be further segmented into a horizontal image (left, front, right) and a vertical image (top, back, bottom) for distribution within existing codec infrastructure. In one such exemplary variant, the split EAC images are each composed of three (3) 1344×1344 pixel facets (e.g., 4032×1344). The split EAC images fit within 4K video formats supported by Level 5.2 HEVC encoder/decoders; this much more preferable to requiring expensive Level 6 HEVC encoder/decoders or the much slower software emulator codecs. The resulting EAC image provides a horizon of four (4) 1344×1344 pixels and can be used with very little post-processing to interpolate a 360° panorama of 5760 pixels.

In a related tangent, commodity codecs were originally designed and optimized for equirectangular projections (ERP) in mind. As a result, the most common A/V formats often resort to lossy encoding for e.g., non-equirectangular projections (non-ERPs). Lossily encoded images that are stitched "off-camera" can result in undesirable image artifacts because the post-process stitching is working with distorted images rather than original source images (e.g., the spherical video may have non-linear motion artifacts at the stitching seam).

In contrast, exemplary embodiments of the present disclosure stitch "in-camera." Even though the in-camera stitched image cannot be natively transferred off camera (the stitched image is larger than the commodity codec A/V formats), the in-camera stitching uses the original source images to ensure that the resulting stitched image seamlessly transitions between perspectives, thereby minimizing non-linear motion artifacts. After in-camera stitching, the stitched image can be split into formats that can be supported in the commodity codec ecosystem.

Various other improvements and aspects of the present disclosure will be readily appreciated by those of ordinary skill, given the contents of the present disclosure. More generally, the various techniques described herein may be broadly applied to any application for media formats that must be used within the existing ecosystem of media codecs.

Exemplary Capture and Rendering Systems for High Resolution Imaging Content—

Referring now to FIG. 1A, an exemplary system 100 for the capture and encoding of high resolution imaging content is shown. As used herein, the terms "high resolution" and "high resolution imaging content" refers to the fact that, for example, natively captured imaging content (e.g., still images, video content, stereoscopic, and/or panoramic versions of the foregoing) may not be compatible with a single instance of, for example, extant video encoders/decoders (e.g., codecs). For example, common smartphone device codecs are typically limited to 2K image resolution (approximately 2048×1080 pixels) at sixty (60) frames per second or 3K image resolution (approximately 2880×1620 pixels) at thirty (30) frames per second. However, it is not uncommon for image capture devices to natively capture imaging content at higher resolutions and higher frame rates than are currently supported by many single instances of these extant video codecs. For example, and referring back to FIG. 1A, the image capture device 110 (e.g., camera) may be capable of generating, for example, 4K image resolution (e.g., 3840×2160 Ultra High Definition, 4096×2160 depending on aspect ratio and rendering/display device, or 4032×2688 for a projection produced by a fisheye camera) at sixty (60) frames per second or 6K image resolution (e.g., 5760× 4320, 5760×3240, 6144×3072 or similar, depending on aspect ratio) or 8K image resolution (e.g., 7680×4320) at thirty (30) frames per second. While the aforementioned image resolutions and frame rates are exemplary, it would be readily apparent to one of ordinary skill given the contents of the present disclosure that the present disclosure is not so limited, these aforementioned image resolutions and frame rates merely being exemplary.

The captured imaging content (e.g., natively captured imaging content) may be coupled to an image splitter 120 on the encode-side of the capture side of the processing pipeline. For example, the image splitter 120 may be resident on the image capture device 110 in some implementations. The image splitter 120 may be in signal communication with the image capture device 110 via either a wired or wireless network communications link. The image splitter 120 may split up the captured imaging content and pass along this split up captured imaging content to a series of N encoders 130A . . . 130N.

In some implementations, an encoder may include hardware logic. In other implementations, an encoder may be a software-based logical function emulating the functionality of an encoder. Artisans of ordinary skill in the related arts will readily appreciate that hardware logic based codecs are substantially faster than software emulated codecs (e.g., approximately fifty (50) times faster); however, hardware logic is largely inflexible and cannot be changed post-manufacture, whereas software can be easily re-compiled to support new functionality. Notably, some devices may support both onboard hardware codecs for the most common applications, and emulate codecs in software only where needed.

For example, where the value of N is equal to two, the captured imaging content may be bisected into two imaging portions of either identical or asymmetric size. In some implementations, the captured imaging content may be split up so that a portion of the imaging content is shared between two (or more) of the split up frames. As another example, where the value of N is greater than two, the captured imaging content may be divided into N equal imaging portions or N unequal imaging portions. To illustrate, in one implementation, a 6K image having 6144×3072 pixels may be split into nine equal imaging portions (e.g., a 3×3 grid of 2048×1024 pixels). In another implementation, the 6K image may be split into nine unequal imaging portions (e.g., a single 4K image (4096×2048) and five (5) 2K images (2048×1024 pixels)).

In some devices or codecs, exact resolutions may be required. As such, in one variant, the image splitter 120 may add filler pixels (e.g., one or more borders of a single color) to the foregoing image portions. These extra pixels may later be removed during decoding (by e.g., decoders 170A . . . 170N and/or stitch apparatus 180). In another variant, the image splitter 120 may add extrapolated pixels to the foregoing image portions. These extrapolated pixels may later be removed during decoding (by e.g., decoders 170A . . . 170N and/or stitch apparatus 180). Data representative of these extra or extrapolated pixels may be stored in a metadata file, which may be transmitted to the A/V container 140. In another such variant, the image splitter 120 may decimate pixels of the image portions. In a related variant, the image splitter 120 may interpolate pixel values (e.g., collapsing multiple pixel values into a single pixel value). In some such variants, the decimated/interpolated pixels may be recovered during decoding (by e.g., decoders 170A . . . 170N and/or stitch apparatus 180) based on data stored in a metadata file. These and other variants will be discussed in subsequent detail herein with regards to the discussion of FIGS. 2A-2C discussed infra.

The split up imaging content may then be fed to various respective encoders (e.g., 'encoder 1' 130A . . . 'encoder N' 130N, and/or other encoders). For example, in some implementations, the encoders may include H.264 video encoders and the number of encoder instances is two. As a brief aside, many common computing devices may support one or more types of encoders/decoders (such as H.265/MPEG-H HEVC; H.264/MPEG-4 AVC; H.263/MPEG-4 Part 2; H.262/MPEG-2; Microsoft® encoders; Google® encoders and/or various other types of encoders). However, it has been found by the Assignee of the present application that although many of these types of encoders/decoders have limitations with regards to resolution and bit rate, often times these common computing devices may support multiple instances of the same encoder/decoder. In other words, these common computing devices may be "tricked" into encoding/decoding respective portions of, for example, natively captured video content of a higher resolution and/or a higher bit rate, such that each of these respective portions complies with the encoding parameter constraints associated with the underlying codecs supported by these computing devices.

The output of these encoders 130A . . . 130N may be coupled and fed into one or more audio/visual (A/V) containers 140. For example, the A/V container 140 may include an MP4 container format and the multiple instances output from respective encoders 130A . . . 130N may be stored within respective tracks contained within a single MP4 container. In some implementations, the output from respective encoders 130A . . . 130N may be fed into two or more MP4 containers (e.g., into single track MP4 containers, into multiple dual track MP4 containers, and/or into multiple multi-track MP4 containers, etc.). These A/V container(s) 140 may then be transmitted and stored into a storage apparatus (e.g., a hard drive or other types of memory) and/or may be transmitted across an interface (such as a network interface over, for example, the Internet). In one embodiment, the outputted encoded images may be fed into the A/V container separately, i.e., one at a time. One or more of these A/V container(s) may also include respective metadata which may be utilized in order to, inter alia, facilitate rendering of the high resolution imaging content which is described at, for example, FIG. 1B (which may include splitting of imaging content retrieved from the A/V container to enable, e.g., opening of the required number of decoder instances, and feeding of imaging content to respective decoder instances). The aforementioned image splitter 120, encoders 130A . . . 130N, and A/V container 140 may be implemented through the use of a computer program containing computer-readable instructions that may be executed by one or more processing units. These computer-readable instructions may be stored in a computer-readable apparatus (e.g., memory). In some implementations, one or more of the aforementioned image splitter 120, encoders 130A . . . 130N, and A/V container 140 may be implemented through dedicated hardware components (e.g., one or more integrated circuits).

Figure 1B:
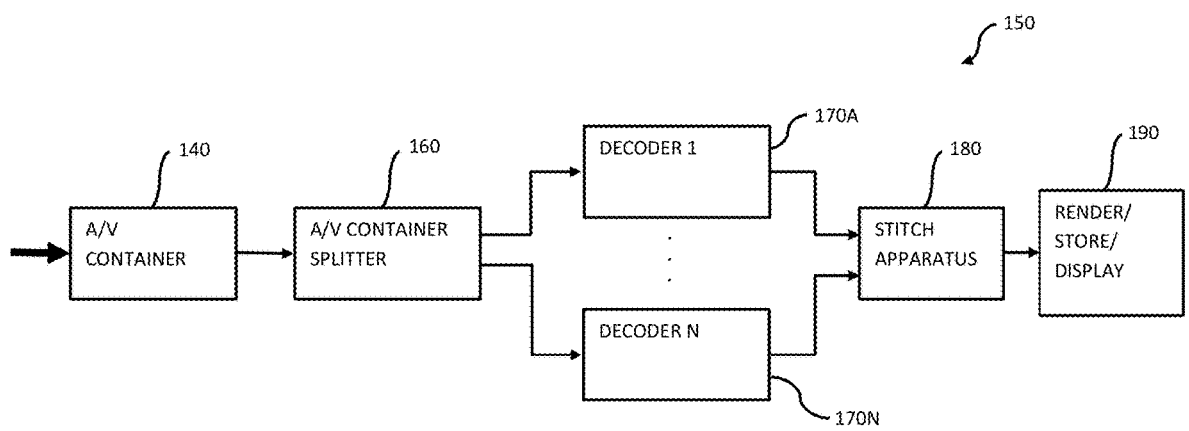
FIG. 1B illustrates a system for rendering high resolution imaging content received from the system of FIG. 1A in accordance with some implementations.

Referring now to FIG. 1B, a system 150 for the rendering of high resolution imaging content is shown and described in detail. The A/V container(s) 140, such as the A/V container(s) output from system 100, may be received/retrieved by system 150. These A/V container(s) 140 may be coupled to an A/V container splitter (decode-side) 160. In some implementations, the A/V container splitter 160 may be embodied within the Quik™ software/computer program application manufactured by the Assignee hereof. In some implementations, the A/V container splitter 160 may read metadata information contained within the A/V container(s) 140 so as to enable the A/V container splitter 160 to, for example, open up the required number of instances of the decoders 170A . . . 170N as well as to properly partition out the imaging portions contained within the A/V container(s) 140 so that these imaging portions may be properly decoded. In another example, the A/V container splitter 160 may allocate/enable the required number of hardware decoders 170A . . . 170N.

Related to the splitting of the captured imaging content described above, in one variant, the number of instances of the decoders may correspond to the value of N. For example, where the captured imaging content was split into N imaging portions, the number of decoders may be N such that each decoder decodes its corresponding imaging portion. In another variant, the number of decoders may be different from the value of N. In some cases, a given decoder may be able to decode more than one of the N imaging portions. Hence, in some cases, for example, two relatively smaller imaging portions may be transmitted to one decoder, while one larger imaging portion may be transmitted to a second decoder. The A/V container splitter 160 may determine different allocations by taking into account capabilities associated with each individual decoder before allocating or assigning a decoder to an imaging portion. In some implementations, a given decoder may be a software-based logical function or module of a hardware decoder, and thus, decoder 172, for example, may have a plurality of distinct decoder functions that may each receive, e.g., a relatively smaller imaging portion discussed above. In some implementations, the opening of additional instances of the decoders may be performed without the underlying knowledge of the user such that the encoding/decoding of this high resolution imaging content may occur seamlessly.

In some embodiments, data related to pixel modifications may be read from, e.g., a metadata file received at the A/V container 140. In one such variant, the decoding may add back decimated/interpolated pixels and/or remove extra pixels or extrapolated pixels based on the metadata file that was generated during image splitting by the image splitter 120 (or during encoding by encoders 130A . . . 130N).

In some implementations, the metadata information (included in or separate from the aforementioned metadata file) may include timestamp information for respective imaging portions so as to enable these imaging portions to be recognized and recombined appropriately by, for example, stitch apparatus 180. Respective imaging portions may be fed to a corresponding decoder instances 170A . . . 170N. For example, in the context of a two-track MP4 container, track one may be fed to a first decoder, while track two may be fed to a second decoder. These and other variants would be readily apparent to one of ordinary skill given the contents of the present disclosure.

The output of decoders 170A . . . 170N may be fed to a stitch apparatus 180. The stitch apparatus 180 may recombine the decoded image portions from the decoders 170A . . . 170N. In some implementations, the stitching algorithm for the stitch apparatus 180 may be simplified and may recombine the decoded image portions based on metadata information contained within the A/V container(s) 140. For example, the stitching may be performed by a fragment shader by reorienting the decoded image portions. Accordingly, as the decoded image portions may be perfectly "cut", no higher level "stitching" is required, rather the decoded image portions may be aligned via pixel alignment in, for example, a graphic processing units' (GPU) fragment shader. In this manner, stitching operations from the stitch apparatus 180 may be substantially simplified allowing for, for example, the recombined decoded images to be output in real-time (or near real-time) to the render/store/display apparatus 190. The render/store/display apparatus 190 may, for example, pass on the entirety of the decoded image to a storage apparatus (e.g., a hard drive or other types of memory) where the entirety of the decoded image is displayed to a user. In some implementations, the render/store/display apparatus 190 may render the entirety of the decoded image and may re-render the entirety of the decoded image to a smaller resolution if desired (e.g., for display on a display device). The aforementioned A/V container 140, A/V container splitter 160, decoders 170A . . . 170N and stitch apparatus 180 may be implemented through the use of a computer program containing computer-readable instructions that may be executed by one or more processing units. These computer-readable instructions may be stored in a computer-readable apparatus (e.g., memory). In some implementations, one or more of the aforementioned A/V container 140, A/V container splitter 160, decoders 170A . . . 170N and stitch apparatus 180 may be implemented through dedicated hardware components (e.g., one or more integrated circuits).

Figure 2A:
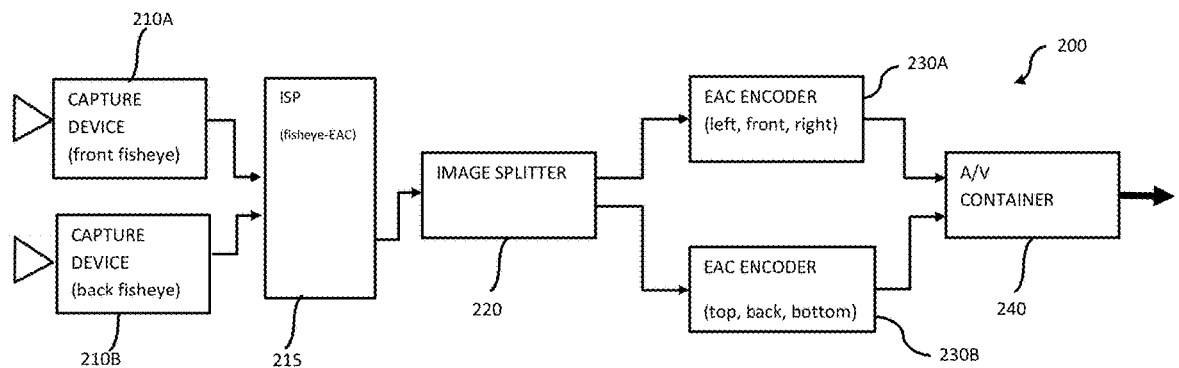
FIG. 2A illustrates a system for the capture and encoding of high resolution imaging content in accordance with some implementations.

Referring now to FIG. 2A, one exemplary system 200 for the capture and encoding of high resolution imaging content is shown. In one exemplary embodiment, the system includes a Janus-type camera that includes a front fisheye camera device 210A and a back fisheye camera device 210B. The front and back camera devices 210A, 210B each capture a greater than 180° fisheye image (thereby resulting in an overlapping "seam" region). The resulting images are stitched by the image signal processor (ISP) 215 into a 360° spherical projection. Other embodiments may use a greater or fewer number of capture devices (e.g., a 1-camera device, 3-camera device, a 4-camera device, 6 camera device, etc.)

As previously noted, stitching "in-camera" is performed on raw image data, thus object motion and/or image parallax can be resolved without artifacts introduced by lossy manipulations. In other words, any motion and/or edge discontinuities within the overlapping areas near the seam can be resolved with the original raw data (as opposed to compression based artifacts that may have been added by lossy manipulations).

Once the image has been stitched, the ISP can perform re-mapping and/or any lossy manipulations if necessary (e.g., decimation, interpolation, padding, extrapolation, etc.) For example, in the illustrated embodiment, the spherical projection is re-mapped into an equal area cubic (EAC) projection. Re-mapping from the spherical projection to the EAC requires some amount of interpolation and/or extrapolation of pixel values to "stretch" the points of a "sphere" into a "cube". For example, re-mapping may require stretching and/or shrinking according to ideal geometric and perspective modelling and mathematics. Re-mapping, interpolation and/or extrapolation can be further described within metadata such that it can be later reversed, and the original stitched image data can be recovered, if necessary.

As a brief aside, an entire EAC image may exceed the capabilities of the most popularly available encoders or decoders. For example, an H.264/MPEG-4 AVC encoder or decoder may come with a set of constraints that indicate a degree of required decoder performance, including, inter alia, a maximum picture resolution, maximum frame rate, and maximum bit rate that an encoder or decoder may use. For example, a "level 5.2" H.264/MPEG-4 AVC encoder or decoder is limited to 4096×2048 pixels at 30 frames per second. Hence, although a level 5.2 encoder and a level 5.2 decoder may be commonly used in imaging systems for their performance/cost advantages, the encoder and decoder would be insufficient for encoding and decoding imaging content having a resolution of 4032×2688 pixels (e.g., corresponding to a six (6) sided cube of 1344×1344 pixel sides) in whole since the encoder and decoder cannot accommodate the frame height of 2688 pixels. Higher-level encoders and decoders (e.g., level 6, 6.1, or 6.2) that can handle sizes larger than 4K may be prohibitively costly for mainstream consumer use, and software emulation of higher-level encoders and decoders may be computationally burdensome (e.g., on the order of 50 times slower than a level 6 hardware encoder or decoder).

Additionally, most codecs in popular use (e.g., HEVC, MPEG, etc.) are based on frequency domain transforms (e.g., discrete cosine transform (DCT), discrete Fourier transforms (DFT), etc.) In frequency domain transforms, sharp edges and/or sudden changes in image data are mathematically represented with high frequency components. Unfortunately, these high frequency components may introduce problems during codec operation. For example, high frequency components are often removed during lossy compression. When the image data is reconstructed without the high frequency components, the sharp edges and/or sudden changes are "blurred" or otherwise reconstructed at lower fidelity. Additionally, images with significant amounts of high frequency content can consume more power and/or tax marginal operation. As a result, minimizing image discontinuities generally results in better compression and/or better reproduction.

Referring back to FIG. 2A, the partitioned EAC content may be coupled to an image splitter 220. The image splitter 220 may be in signal communication with the image capture devices 210A, 210B via either a wired or wireless network communications link. In one exemplary embodiment, the EAC content can be partitioned into two (2) image segments: a horizontal image (composed of the left, front, and right faces), and a vertical image (composed of the top, back, and bottom faces.) Artisans of ordinary skill in the related arts will readily appreciate that each of the two (2) image segments represent a contiguous 270 (three (3) cube facets) subset of the 360° panorama (four (4) cube facets). A horizontal 360° panorama could be reconstructed from the horizontal image segments (left, front, and right) as well as a rotated portion of the vertical image segment (the back face). Grouping the horizontal and vertical image segments in this contiguous fashion ensure that the facets have minimal image discontinuity. Moreover, each of the image segments is only 4032×1344 pixels in size, which is well within the capabilities of most commonly available codecs. In other words, the organization of cube facets minimizes the undesirable effects of edges and motion that span multiple facets, and the partitioning of cube facets ensures that the images can be easily distributed in existing codec ecosystems. In this manner, the overall codec performance can be improved and the resulting image data is minimally affected by lossy compression.

While the illustrated embodiment partitions the stitched EAC content into two (2) image segments, other variants may use a greater number of image segments. For example, the EAC content could be split into three (3) pairs of contiguous facets e.g., a top-back pair, a front-left pair, and a right-bottom pair. Still other splits may duplicate facets to e.g., present fewer seams in a particular viewing horizon, etc. As another example, the EAC content could be split into two (2) rings of e.g., a top-back-bottom-front ring, and a front-left-back-right ring. Still other variants may be substituted with equal success by artisans of ordinary skill in the related arts, given the contents of the present disclosure.

Moreover, while the illustrated embodiment equally partitions the EAC content into symmetrically sized segments, other configurations may use different partitioning schemes. For example, the captured imaging content may be bisected into two imaging portions of either identical or asymmetric size. In some implementations, the captured imaging content may be split up so that a portion of the imaging content is shared between two (or more) of the split up frames. In some implementations, a given EAC encoder may be a software-based logical function or module of a discrete EAC encoder, and may have a plurality of distinct encoder functions that may each receive an imaging portion from the image splitter 220.

As a brief aside, the EAC image segments may preserve some amount of the original image information density (the amount of image information represented by each pixel). In other words, it is appreciated that pixels that have been "shrunk" or "stretched" during mapping correspond to more or less of the original image information density. For example, duplicating a single original pixel value into two re-mapped pixels does not change the pixel information; instead, the information density of the re-mapped pixels is half of the original pixel value. In some cases, re-mapping modifications may result in some loss in original information density; this loss may be offset by the fact that the EAC image may be handled with a broad ecosystem of hardware compression.

The EAC image segments may then be fed to various respective encoders (e.g., EAC encoder 230A, 230B). For example, the EAC encoders may include H.264 video encoders. As another example, the EAC encoders may include JPEG video encoders. As a brief aside, many common computing devices may support one or more types of encoders/decoders (such as H.265/MPEG-H HEVC; H.264/MPEG-4 AVC; H.263/MPEG-4 Part 2; H.262/MPEG-2; Microsoft® encoders; Google® encoders and/or various other types of encoders).

Each EAC encoder 230A, 230B may generate one or more encoded audio/visual (A/V) containers 240. For example, the A/V container 240 may include an MP4 container format and the multiple instances output from respective EAC encoders 230A, 230B may be stored within respective tracks contained within a single MP4 container. In some implementations, the output from respective EAC encoders 230A, 230B may be fed into two or more MP4 containers (e.g., into single track MP4 containers, into multiple dual track MP4 containers, and/or into multiple multi-track MP4 containers, etc.). These A/V container(s) 240 may then be transmitted and stored into a storage apparatus (e.g., a hard drive or other types of memory) and/or may be transmitted across an interface (such as a network interface over, for example, the Internet). In one embodiment, the outputted encoded images may be fed into the A/V container separately, i.e., one at a time. One or more of these A/V container(s) may also include respective metadata which may be utilized in order to, inter alia, facilitate rendering of the high resolution imaging content. The aforementioned image splitter 220, ISP 215, EAC encoders 230A, 230B, and A/V container 240 may be implemented through the use of a computer program containing computer-readable instructions that may be executed by one or more processing units. These computer-readable instructions may be stored in a computer-readable apparatus (e.g., memory).

In some implementations, one or more of the aforementioned image splitter 220, ISP 215, EAC encoders 230A, 230B, and A/V container 240 may be implemented through dedicated hardware components (e.g., one or more integrated circuits).

Figure 2B:
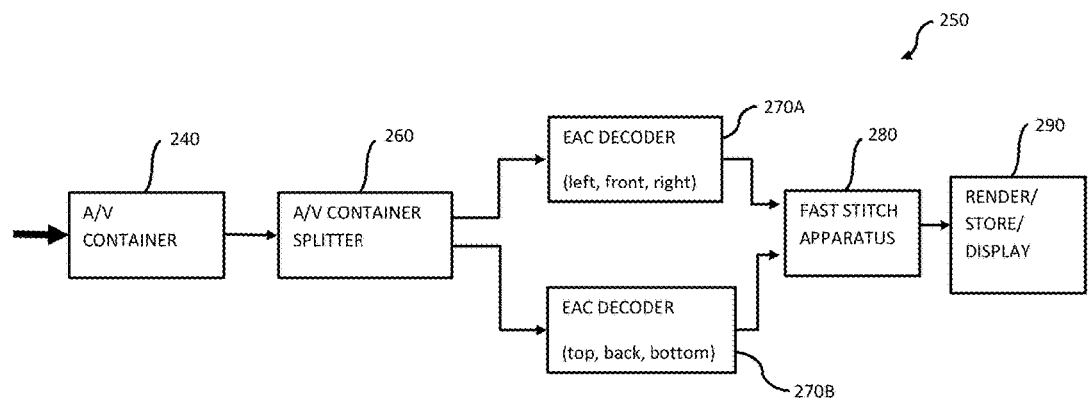
FIG. 2B illustrates a system for rendering high resolution imaging content received from the system of FIG. 2A in accordance with some implementations.

Referring now to FIG. 2B, a system 250 for the rendering of high resolution imaging content is shown and described in detail. The A/V container(s) 240, such as the A/V container(s) output from system 200, may be received or retrieved by system 250. These A/V container(s) 240 may be coupled to an A/V container splitter (decode-side) 260. In some implementations, the A/V container splitter 260 may read metadata information contained within the A/V container(s) 240 so as to enable the A/V container splitter 260 to, for example, configure the EAC decoders 270A, 270B, as well as to properly partition out the imaging portions contained within the A/V container(s) 240 so that these imaging portions may be properly decoded.

As previously noted, imaging content (e.g., EAC projections that have been divided into two portions by the image splitter 220 or A/V container splitter 260, where each portion has a resolution of 4032×1344) would allow a typical level 5.2 encoder or decoder to handle each of the portions. Advantageously, encoded EAC projections may be split at the seam that separates each projection, i.e., one projection having left, front, and right faces, and another projection having top, back, and bottom faces. The natural division at the seam greatly reduces bit errors as well as file size arising from high-frequency computations at high-variation spaces (e.g., color space) that are difficult to compress.

Incidentally, each EAC facet may measure 1344×1344 (e.g., left face, front face, right face). Four faces each having a resolution of 1344×1344 together results in an image (e.g., panorama) resolution of 5376 in width (5376×1344). A panoramic width of 5760 pixels is able to provide a resolution of 1080p when viewed in any direction. Hence, a panoramic image (having a width approximate to the 5760 pixels) resulting from the aforementioned EAC encode and decode would retain a satisfactory image quality for a user.

The illustrated A/V container splitter 260 splits the A/V container equally for the EAC decoders 270A, 270B, however other configurations may use different partitioning schemes of either identical or asymmetric size. In some implementations, the captured imaging content may be split up so that a portion of the imaging content is shared between two (or more) of the split up frames. In some implementations, an EAC decoder may be a software-based logical function or module of a discrete EAC decoder, and may have a plurality of distinct decoder functions that may each receive an imaging portion from the A/V container splitter 260.

In some implementations, the metadata information (included in or separate from any metadata file containing data related to the added pixels) may include timestamp information for respective imaging portions so as to enable these imaging portions to be recognized and recombined appropriately by, for example, stitch apparatus 280. Respective imaging portions may be fed to a corresponding EAC decoder instance 270A, 270B. For example, in the context of a two-track MP4 container, track one may be fed to decoder 270A, while track two may be fed to decoder 270B. These and other variants would be readily apparent to one of ordinary skill given the contents of the present disclosure.

The output of EAC decoders 270A, 270B may be fed to a fast stitch apparatus 280. The fast stitch apparatus 280 may recombine the decoded image portions from the EAC decoders 270A, 270B. In one exemplary implementation, the stitching algorithm for the stitch apparatus 280 may be simplified and may recombine the decoded image portions based on metadata information contained within the A/V container(s) 240. For example, the stitching may be performed by a fragment shader by reorienting the decoded image portions. Accordingly, as the decoded image portions may be perfectly "cut", no higher level "stitching" is required, rather the decoded image portions may be aligned via pixel alignment in, for example, a graphic processing units' (GPU) fragment shader. In this manner, stitching operations from the stitch apparatus 280 may be substantially simplified allowing for, for example, the recombined decoded images to be output in real-time (or near real-time) to the render/store/display apparatus 290. The render/store/display apparatus 290 may, for example, pass on the entirety of the decoded image to a storage apparatus (e.g., a hard drive or other types of memory) where the entirety of the decoded image is displayed to a user. In some implementations, the render/store/display apparatus 290 may render the entirety of the decoded image and may re-render the entirety of the decoded image to a smaller resolution if desired (e.g., for display on a display device). The aforementioned A/V container 240, A/V container splitter 260, EAC decoders 270A, 270B and stitch apparatus 280 may be implemented through the use of a computer program containing computer-readable instructions that may be executed by one or more processing units. These computer-readable instructions may be stored in a computer-readable apparatus (e.g., memory). In some implementations, one or more of the aforementioned A/V container 240, A/V container splitter 260, EAC decoders 270A, 270B and stitch apparatus 280 may be implemented through dedicated hardware components (e.g., one or more integrated circuits).

In some embodiments, the system 200 and the system 250 may be located and/or performed at different entities. For example, the system 200 (including capture device 210, image splitter 220, ISP 215, EAC encoders 230A 230B, and/or A/V container 240) may be located on a single device (e.g., capturing device such as a camera, mobile user device, graphics engine). The system 250 (including A/V container 240, A/V container splitter 260, EAC decoders 270A, 270B, stitch apparatus 280, and/or render/store/display apparatus 290) may be located on a different device (e.g., mobile user device, storage device, graphics engine) that is separate from the abovementioned device.

Referring now to FIGS. 3A-3C, various methodologies for the splitting up of images captured by capture device 110 using the image splitter on the encode-side 120 are shown and described in detail. For example, and referring now to FIG. 3A, the captured image 300A may be bisected into, for example, top 310A and bottom portions 310B. Additionally, as the encoders may be capable of handling higher resolutions and higher bit rates than that contained within each of the top 310A and bottom portions 310B by themselves, additional metadata may be inserted into one or both of these imaging portions. This metadata may include, for example, the aforementioned timestamp information so as to link the top and bottom portions in time for later recombination. This metadata may also include, for example, one or more of the original resolution and bit rates (e.g., 4K resolution at sixty (60) frames per second), the manner in which the original image has been split (e.g., top and bottom) as well as where the imaging portions 310A, 310B reside within the original image (e.g., imaging portion 310A resides at the top of the original image while imaging portion 310B resides at the bottom of the original image, etc.).

Moreover, while primarily described in the context of splitting up an original image into two equally sized respective imaging portions, it would be readily apparent to one of ordinary skill given the contents of the present disclosure that an original image 300A may be split into asymmetric imaging portions (e.g., top imaging portion 310A may be larger in image size than bottom imaging portion 310B) or may even be split into three or more imaging portions (e.g., top, middle, and bottom imaging portions). The use of asymmetric imaging portion splits may be particularly suitable for, for example, the insertion of text onto a portion of the split up portions; the application of various post-processing applications (e.g., application of a contrast operation to one or more (but not all)) of the imaging portions; the insertion of telemetry information for objects contained within an imaging portion; for purposes of localized object detection, and other suitable techniques that would be readily apparent to one of ordinary skill given the contents of the present disclosure. Moreover, in some implementations it may be desirable to split up these imaging portions into left and right imaging portions; or left, middle, and right imaging portions in some implementations.

In some implementations, it may be desired to include a lower resolution version (LRV) of the high resolution image as, for example, a separate track (e.g., track one) within the A/V container that also contains separate track(s) (e.g., tracks two and three) of the high resolution version of the imaging data. The LRV of the high resolution image may also be stored within a separate A/V container. In implementations in which the LRV is stored separately, metadata may be stored in the LRV A/V container, and/or within the high resolution A/V container so that these separate containers may be, for example, readily linked. In some implementations, the inclusion of the LRV of the high resolution image may have utility for a full screen preview of the underlying captured image in instances where some players (codecs) have an inability to decode the high resolution images (e.g., the high resolution images contained within tracks two and three).

Referring now to FIG. 3B, yet another methodology for the splitting up of an original image 300B is shown and described in detail. For example, the image may be split up between an area of expected interest (e.g., between the two dashed lines in original image 300B). This area of expected interest may be split into imaging portion 320A, while the imaging portions above and below these dashed lines in original image 300B may be split into imaging portion 320B. For example, in the context of panoramic imaging content captured by image capture device 110, the area of expected interest may reside along the equator and may include, for example, the front, left, and right views of an image; while the area of least expected interest may reside at the poles (e.g., up and down views). In some implementations, various ones of the implementations described with respect to FIG. 3A may be utilized in conjunction with the image splitting methodology described in FIG. 3B (e.g., asymmetric splits, three or more splits, left and right splits, etc.). For example, the expected area of interest may constitute 60% of the total imaging area and stored within a first track of an A/V container, while, for example, the top 20% and bottom 20% of the total imaging area may be stored within a second track of the same A/V container.

Referring now to FIG. 3C, yet another methodology for splitting up an original image 300C is shown and described in detail. For example, image 300C may include an overlap region where identical (or near identical) imaging content is displayed in both of the split images 330A and 330B. For example, the area of overlap may include one to ten percent (1%-10%) of the total image area. Such an implementation as illustrated in FIG. 3C may improve upon the encoding efficiency associated with the encoding of individual imaging portion 330A and individual imaging portion 330B. For example, motion estimation information may now be included in the overlap regions contained within both image portion 330A and image portion 330B. The encoding efficiency of image portion 330A and 330B may be improved over variants in which there is no overlap in imaging content (such as that shown in implementations of FIGS. 3A and 3B). In some implementations, various ones of the implementations described with respect to FIGS. 3A and 3B may be utilized in conjunction with the image splitting methodology described in FIG. 3C (e.g., asymmetric splits, three or more splits, left and right splits, stitching based on overlap region, etc.).

Figure 4A:
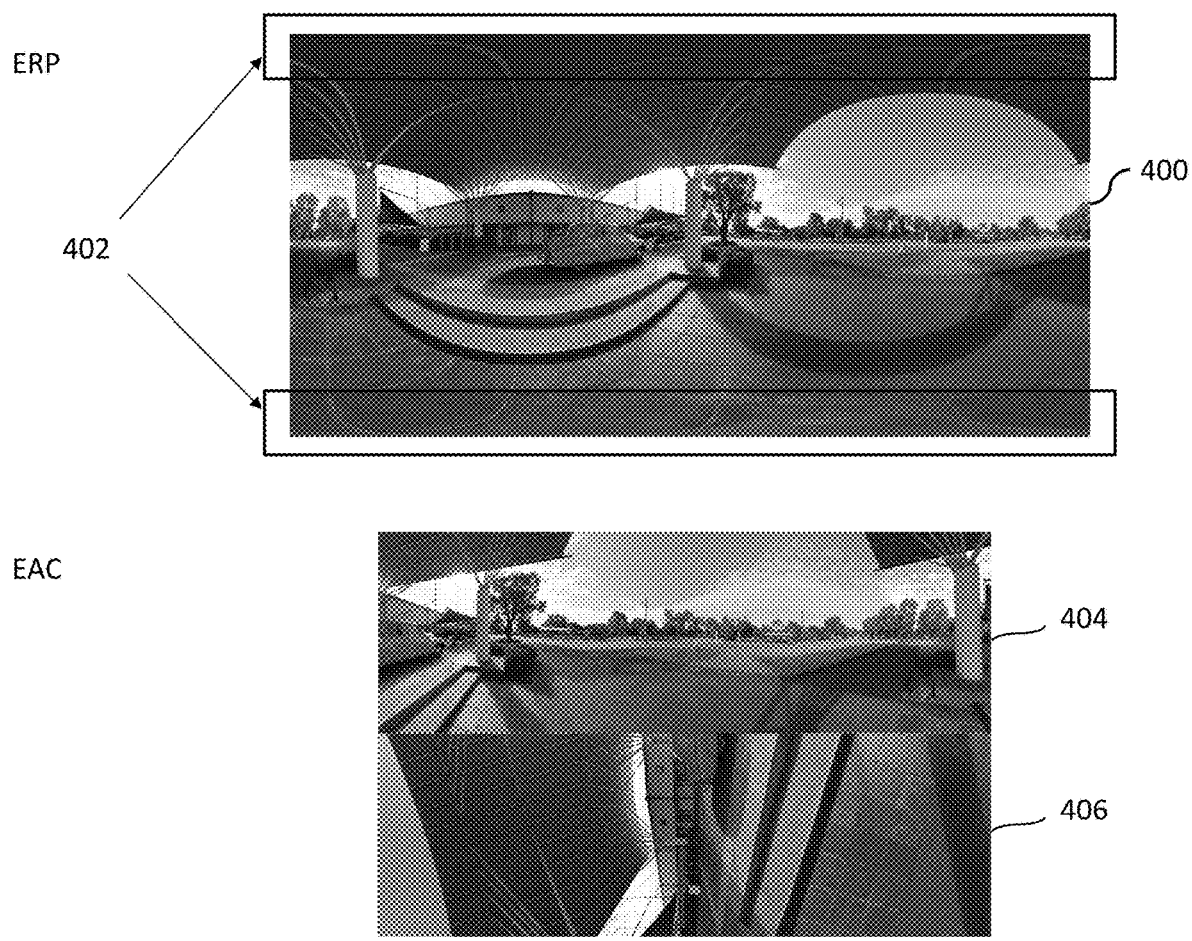
FIG. 4A illustrates a visual comparison of two projection formats of imaging content, useful for illustrating various aspects of the present disclosure.

Referring now to FIG. 4A, a visual comparison is illustrated between an equirectangular projection (ERP) format of fisheye imaging content and a cube-map projection format of fisheye imaging content. The ERP 400 shows a view of a scene that captures 3600 around a capture device having, e.g., dual fisheye lens (e.g., capture device 210). In the illustrated image, the ERP is described by tan(e) over an 180° vertical range, which creates significant distortion at the poles 402. In other words, tan(e) has asymptotic behavior at −90° and 90° (i.e., the poles 402 are highly distorted).

In contrast to ERP, the cube-map projection is an equal area cubic (EAC) image having two portions 404, 406 each representing different segments of a cubic projection. The EAC portion 404 shows the horizontal 270° centered about the "front" of the capture device. The EAC portion 406 shows the vertical 270° centered about the "back" of the capture device. In the illustrated image, the EAC uses tan(e) over a vertical 90° range. Unlike ERP, the EAC only spans −45° and 45° (which is not asymptotic), greatly reducing image distortions.

Traditionally, the EAC projection may contain less information density (caused by, e.g., lossy scaling) than original fisheye images, but the EAC projection preserves more of the information density than ERP images. Moreover, as is evident in the EAC image of FIG. 4A, a horizontal seam is visible across the middle of the image. Advantageously, breaking the EAC content at this seam allows a rapid division and transmission to corresponding decoders. For example, one portion 404 may fed to a first EAC decoder, and the other portion 406 may be fed to a second EAC decoder.

Figure 4B:
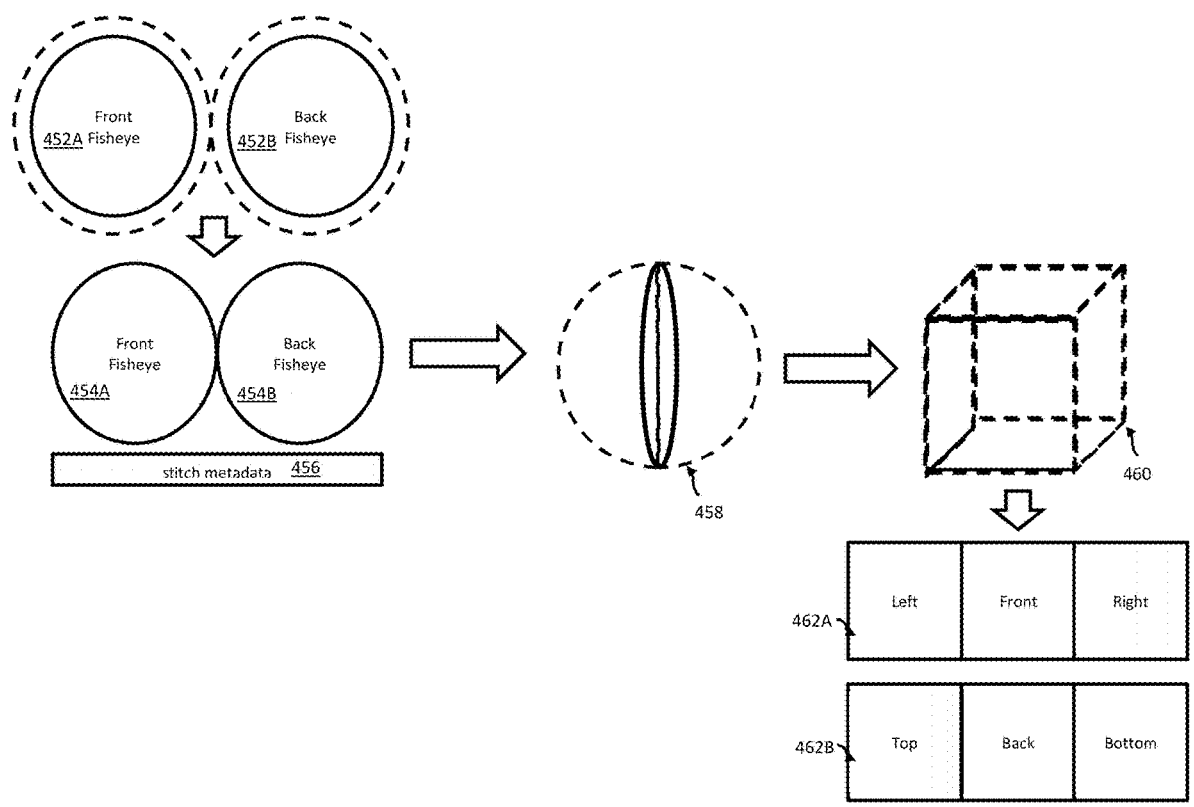
FIG. 4B illustrate conversions from wide-angle images to respective equal area cubic (EAC) images, in accordance with one exemplary implementation.

FIG. 4B illustrates a diagram showing a conversion process from a spherical projection to the segments of an equal area cubic (EAC) projection. In various embodiments, a fisheye camera or capture device may capture hemispheric image data that corresponds to fisheye images 452A, 452B having a field of view. Each fisheye image 452A, 452B may be taken by a fisheye lens out of a plurality of lenses; for example, an image capturing system may include two fisheye lenses in a Janus-configuration, one facing in a "front" direction and another facing in a "back" direction. In one variant, the fisheye image has a field of view of greater than 180 degrees. The overlapping area can be used to assist in stitching.

The fisheye image data may be stitched "in-camera" into two (2) hemispheres 454A, 454B of a spherical projection 458. Artisans of ordinary skill in the related arts will readily appreciate that stitching in-camera must image information between the two (2) original images 452A, 452B in order to generate the two (2) hemispheres 454A, 4534B of a spherical projection 458; this process may result in some information loss. As a result, in some variants, the stitching information 456 may additionally be retained for subsequent editing (e.g., re-stitching at higher quality, etc.) As previously noted, stitching techniques commonly entail e.g., combining multiple images to ideally produce an imperceptible (or minimally perceptible) transition between the two (2) hemispheres 454A, 454B of the spherical projection 458. Image stitching techniques commonly include e.g., edge detection, motion detection, parallax correction, perspective warping, blending, lighting adjustment, and/or any number of other image modifications commonly used in the related arts.

Referring back to FIG. 4B, the spherical projection 458 is converted into an EAC projection 460. As previously noted, the EAC projection may entail warping the spherical projection according to the ideal mathematical differences between the spherical projection and the EAC projection. Notably, an ideal mathematical transform from the EAC projection can be performed without information loss. In other words, some mathematical transforms can enable a lossless conversion from spherical-to-EAC conversion and vice versa. However, some embodiments of the present disclosure may additionally remove image information so as to e.g., fit within various codec parameters. More directly, in some cases, information loss may be preferred to fit within certain encoding/decoding limitations of a hardware or software codec.

In one embodiment, the EAC image 460 may represent a "panoramic" view including multiple portions that are viewable by, e.g., a viewfinder, physical or otherwise; e.g., a viewfinder may refer to portion of a larger panoramic image which is virtually navigable via a user interface, and the panoramic image may be stored and/or accessible on a device (e.g., user device) and/or a system that accesses the panoramic image stored on a remote server or storage device separate from the user interface.

In one implementation, the converted EAC image 460 can be further split into a first image segment 462A corresponding to the left, front, and right facets, and se second image segment 462B corresponding to the top, back, and bottom facets. Although the facets may be labeled as such, the labeling is wholly arbitrary and denoted for ease of identifying relative directions, including with respect to any other EAC image. Each facet may have a resolution of 1344×1344, and thus each EAC image segment (having three facets) may have a resolution of 4032×1344. In one illustrative scenario, the aforementioned viewfinder may be able to view one facet or a portion thereof. It is appreciated that other resolutions for the EAC facet or EAC image (e.g., if facets are overlapped, or if filled with null data between facets) may be produced in other imaging systems or fisheye lenses.

As should be apparent given the contents of the present disclosure, the entire process may be reversibly performed in a lossless manner. For example, EAC image segments 462A, 462B can be joined together to recreate the EAC cubic structure 460. In at least one exemplary embodiment, the EAC cubic structure 460 can be transformed losslessly back into a spherical projection 458. The stitching metadata 456 retains all of the information necessary to re-stitch the two (2) hemispheres 454A, 454B of the spherical projection 458. In other words, the described principles herein enable stitching of originally captured image data, and selectively performing all subsequent lossy processing in a manner that can be recorded and/or corrected for.

Exemplary Methodologies—

Figure 5A:
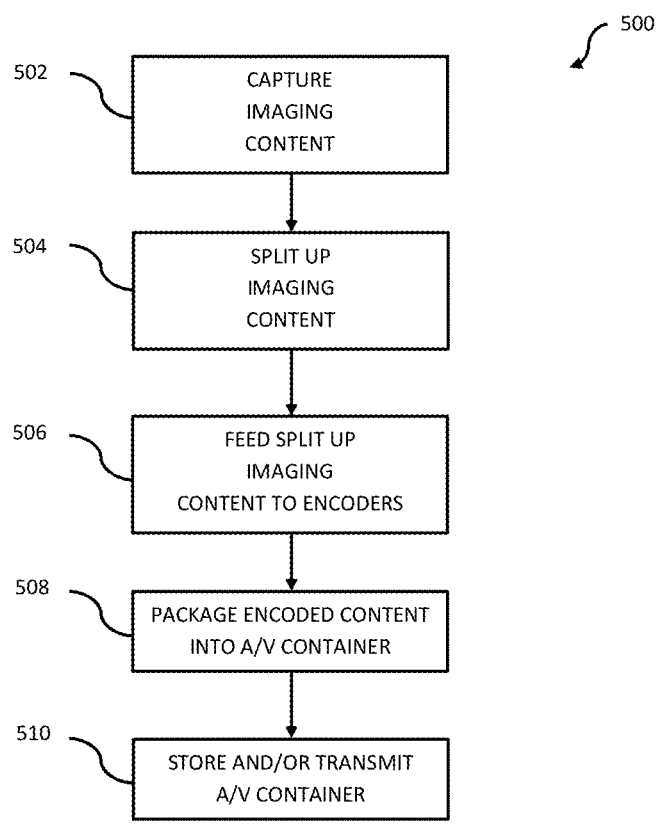
FIG. 5A is a flow chart illustrating a process for the capture and encoding of high resolution imaging content in accordance with some implementations.

Referring now to FIG. 5A, one exemplary process 500 for the capture and encoding of high resolution imaging content is shown and described in detail. At operation 502, imaging content (such as native imaging content) is captured. In some implementations, the imaging content captured may include video content (e.g., panoramic imaging content) that is captured at a higher resolution than is supported by many extant imaging codecs. For example, the imaging content captured may include imaging content captured at 6K image resolution at thirty (30) frames per second. As but yet another example, the imaging content captured may include imaging content captured may include imaging content captured at 4K image resolution at sixty (60) frames per second. In one specific implementation, the imaging content includes fisheye imaging content generated by a fisheye camera. The captured fisheye imaging content may include an image having portions captured by multiple cameras (e.g., one facing one direction and another facing the opposite direction).

Figure 5B:
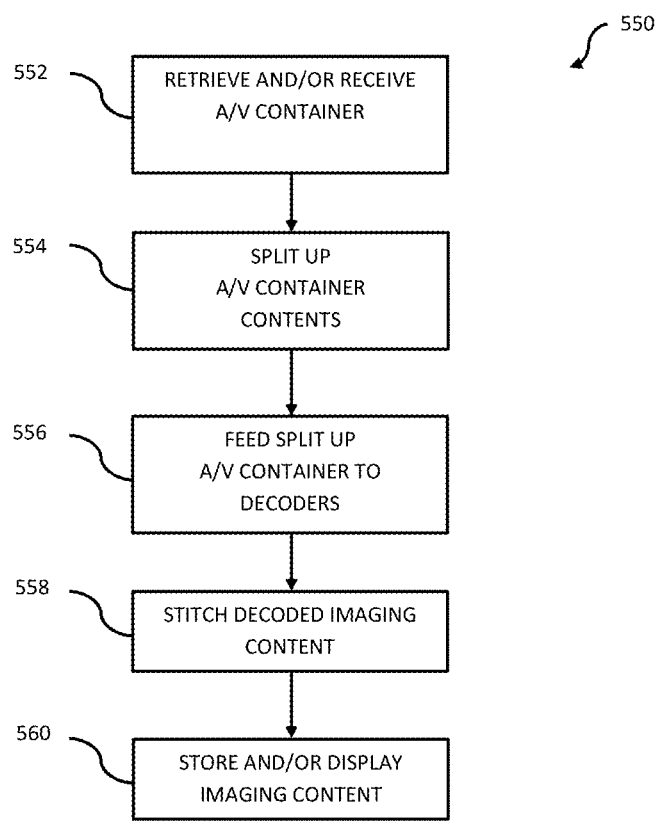
FIG. 5B is a flow chart illustrating a process for rendering high resolution imaging content in accordance with some implementations.

At operation 504, the imaging content captured may be split up. In some implementations, the imaging content may be split up using one or more of the methodologies described herein with reference to FIGS. 3A-3C. In some implementations, the imaging content may be split up using one or more of the methodologies described herein with reference to FIGS. 4A and 4B. In some variants, the split up imaging content may include metadata that enables the split up of imaging content to be reconstructed at operation 558 (FIG. 5B). In one particular embodiment, the imaging content may be split into two (2) segments of an equal area cubic (EAC) image.

At operation 506, the split up imaging content may be fed to respective instances of an imaging encoder. In one embodiment, each instance of the imaging encoder may be a discrete hardware encoder. In another embodiment, each instance of the imaging encoder may be a software-based function. For example, the imaging content captured at operation 502 may not be compatible with an extant single instance of an encoder; however, by virtue of the fact that the imaging content has been split up at operation 504, multiple instances of encoders (e.g., encoders 130A . . . 130N in FIG. 1A or EAC encoders 230A, 230B in FIG. 2A) may now collectively be compatible with respective imaging portions. In some embodiments, metadata may be generated and/or retrieved during encoding, and may be included with the encoded content when it is transferred to the A/V container. Such metadata may contain information to facilitate, inter alia, rendering of the high resolution imaging content as discussed with respect to FIG. 5B, which may include splitting imaging content retrieved from the A/V container to enable, e.g., opening of the required number of decoder instances, and feeding of imaging content to respective decoder instances.

In one embodiment, the split up imaging content is fed to respective instances of an EAC encoder (e.g., 230A, 230B). In various implementations, the EAC encoders may be associated with a particular "level" such as a level 5.2 H.264/MPEG-4 AVC encoder capable of handling the split up imaging content up to a particular resolution and frame rate of 4096×2048 at 30 frames per second (but not necessarily the native imaging content because of the foregoing limitations present on the level of encoder). The splitting of imaging content advantageously allows lower-level encoders (i.e., lower-cost level 5.2 encoders) to be used with imaging content of larger native resolutions. Each EAC encoder may be configured to generate an EAC image such as that shown in FIGS. 4A and 4B.

In one exemplary embodiment, a "horizontal" image segment may be generated that includes left, front, and right facets of a cubic projection concatenated together. A "vertical" image segment may be generated that includes top, back, and bottom facets concatenated together. A given generated EAC image segment may have a resolution of 4032×1344. In various implementations, the EAC image segment generated by the EAC encoder may have a plurality of portions, e.g., three faces of a cube each having equal width and height (of 1344 pixels), such as those shown in FIGS. 4A and 4B. Hence, the resulting split and encoded EAC images having a resolution of 4032×1344 can fit within 4096×2160 container formats supported by the level 5.2 encoder (and decoder) chains for delivery to a user. Advantageously, this allows a wide variety of devices to encode and decode high-resolution imaging content because higher-level (e.g., level 6 and beyond) encoders (and decoders) are not popularly deployed in consumer devices. Similarly, commodity level 5.2 hardware encoders are many times faster than software-based emulation of higher-level encoders and decoders.

At operation 508, the encoded content may be packaged into one or more A/V containers. For example, in some implementations, the encoded content may be packaged within separate tracks of a single A/V container (e.g., an MP4 container). In some implementations, the encoded portions of content may be packaged within separate A/V containers (e.g., separate MP4 containers). For example, the imaging content captured at operation 502 may include 6K resolution video content captured at thirty (30) frames per second. This captured imaging content may then be packaged into separate tracks for a given A/V container, each track including, for example, 3K resolution video content packaged at thirty (30) frames per second. As but another example, the imaging content captured at operation 502 may include 4K resolution video content captured at sixty (60) frames per second and the captured imaging content may be packaged into separate tracks for a given A/V container, each track including 2K resolution video content packaged at sixty (60) frames per second. These and other variations would be readily apparent to one of ordinary skill given the contents of the present disclosure. At operation 510, this packaged encoded A/V container content may be stored and/or transmitted.

Referring now to FIG. 5B, one exemplary process 550 for rendering high resolution imaging content is shown and described in detail. At operation 552, A/V container(s), such as A/V containers stored and/or transmitted at operation 510 (FIG. 5A), are retrieved and/or received.

At operation 554, the A/V container(s) are split up prior to being decoded at operation 556. In some implementations, one or more of the A/V container(s) may include metadata which instructs the methodology by which the A/V container(s) are to be split up.

At operation 556, the split up A/V container(s) are fed to respective ones of imaging decoders. For example, the imaging content captured at operation 502 may include 6K resolution video content captured at thirty (30) frames per second. This captured imaging content may be packaged into separate tracks for a given A/V container, each track including 3K resolution video content packaged at thirty (30) frames per second. Accordingly, each track including 3K resolution video content packaged at thirty (30) frames per second may be decoded at operation 556.

As but another example, the imaging content captured at operation 502 may include 4K resolution video content captured at sixty (60) frames per second and the captured imaging content may be packaged into separate tracks for a given A/V container, each track including 2K resolution video content packaged at sixty (60) frames per second. Accordingly, each track including 2K resolution video content packaged at sixty (60) frames per second may be decoded at operation 556. These and other variations would be readily apparent to one of ordinary skill given the contents of the present disclosure.

In one embodiment, the A/V container(s) and their contents may be fed to respective instances of EAC decoders (e.g., 270A, 270B). Each EAC decoder may be configured to reconstruct each EAC image segment of the corresponding cubic projection format. In various implementations, the EAC decoders may be of a particular "level" such as a level 5.2 H.264/MPEG-4 AVC decoder capable of handling the split up A/V containers (but not necessarily the encoded imaging content because of limitations present on the level of decoder). The splitting of encoded imaging content advantageously allows lower-level (i.e., lower-cost) decoders to be used with imaging content of larger resolutions.

At operation 558, the decoded imaging content may be stitched together so as to recombine the decoded imaging content into, for example, the original captured content at the native resolution and the native bit rate. In some implementations, the stitching operation at 558 may utilize pixel alignment in a GPU fragment shader.

In one exemplary embodiment, the stitching may be performed as a "fast stitch". As used herein, the term "fast" when used in the context of stitching refers to stitching based on only explicit image data. More directly, fast stitching does not rely on inferred, interpolated, or extrapolated image information. In other words, every pixel (e.g., movement, stretch, shrink, shade, etc.) is associated with explicit image information that is neither gained nor lost with fast stitching.

In one implementation, two EAC image segments are reconstructed into an EAC cubic format. In one exemplary embodiment, the EAC cubic format may be further re-projected into a spherical projection. In one such variant, the re-projection is a mathematically lossless transformation. In some embodiments, stitching metadata from the in-camera stitch is also provided, such that the spherical projection may be further decomposed into the original image information (e.g., originally captured fisheye image data).

In one exemplary embodiment, the stitching may be performed as a "slow stitch" and/or "re-stitched". As used herein, the term "slow" when used in the context of stitching refers to stitching that requires the inference, interpolation, or extrapolation of additional data. In other words, slow stitching may make assumptions about how two images are to be stitched based on e.g., estimated parallax, blending, perspective shift, motion, and/or a variety of other pattern matching techniques. Since the original image data may be ignored and/or augmented, image information may be changed (e.g., signal and/or noise may be amplified). In some cases, slow stitching may be further augmented with the original in-camera stitching metadata.

In one implementation, two EAC image segments are reconstructed into an EAC cubic format. In one exemplary embodiment, the EAC cubic format may be further re-projected into a spherical projection. In one such variant, the re-projection is a mathematically lossless transformation. In some embodiments, stitching metadata from the in-camera stitch is also provided, such that the spherical projection may be further decomposed into the original image information (e.g., originally captured fisheye image data).

In some implementations, only a subset of the EAC image segments are stitched. For example, in one such variant, a user may only be interested in viewing a panoramic 360-degree view. In such a case, only four faces may be required (e.g., left, front, right, back). In another such example, only a 120° viewing angle maybe reconstructed. As previously noted, a width of 5760 pixels is able to provide a resolution of 1080p for any 1200 viewing angle. Hence, an EAC cubic format having a 360° of approximately 5760 pixels (5376 pixels with very little upscaling) resulting from the EAC decode would retain a satisfactory image quality for the user.

At operation 560, the stitched decoded imaging content from operation 558 may be stored in a storage apparatus (e.g., a hard drive or other types of memory, including those on a remote server or storage apparatus accessible by a user). In some implementations, the stitched decoded imaging content (or a portion thereof) from operation 558 may be displayed on a user's display device. The stitched decoded imaging content from operation 558 may be translated to a smaller resolution, if desired, for display to a user's display device. In other variants, a virtual viewfinder on a user interface may also allow a user to view a portion of the stitched decoded imaging content rather than lowering the resolution.

Additional Configuration Considerations—

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A camera apparatus, comprising:
    a first imaging sensor;
    a second imaging sensor;
    processor apparatus; and
    a non-transitory computer-readable medium in data communication with the processor apparatus and comprising one or more instructions which are configured to, when executed by the processor apparatus, cause the camera apparatus to:
        capture a first hemispheric image of a scene via the first imaging sensor;
        capture a second hemispheric image of the scene via the second imaging sensor;
        generate a spherical image of the scene by stitching at least a portion of the first hemispheric image and at least a portion of the second hemispheric image;
        project the spherical image of the scene onto six facets of a cube:
        generate non-hemispheric images of the scene by splitting the spherical image projected onto the six facets of the cube, wherein individual ones of the non-hemispheric images of the scene include a portion of the spherical image projected onto the six facets of the cube and are encoded separately, and wherein the encoded individual ones are packed into A/V containers; and
        store the non-hemispheric images of the scene, wherein the non-hemispheric images of the scene are separately decodable and combinable to provide a spherical view of the scene.

2. The camera apparatus of claim 1, wherein the individual ones of the non-hemispheric images of the scene are stored in separate A/V containers.

3. The camera apparatus of claim 1, wherein the individual ones of the non-hemispheric images of the scene are stored in separate tracks of a media file.

4. The camera apparatus of claim 1, wherein the individual ones of the non-hemispheric images of the scene do not overlap.

5. The camera apparatus of claim 1, wherein at least two of the non-hemispheric images of the scene overlap.

6. The camera apparatus of claim 1 wherein the spherical image projected onto the six facets of the cube are split into two non-hemispheric images, the individual ones of the two non-hemispheric images including the spherical image projected onto three facets of the cube.

7. The camera apparatus of claim 1 wherein the spherical image projected onto the six facets of the cube are split into two non-hemispheric images, the individual ones of the two non-hemispheric images including the spherical image projected onto four facets of the cube.

8. The camera apparatus of claim 1 wherein the spherical image projected onto the six facets of the cube are split into three non-hemispheric images, the individual ones of the three non-hemispheric images including the spherical image projected onto two facets of the cube.

9. The camera apparatus of claim 1 wherein the spherical image projected onto the six facets of the cube are split such that the individual ones of the non-hemispheric images include the spherical image projected onto at least two continuous facets.

10. A method for processing images captured via a camera apparatus, comprising:
    capturing a first hemispheric image of a scene via a first imaging sensor;
    capturing a second hemispheric image of the scene via a second imaging sensor;
    generating a spherical image of the scene by stitching at least a portion of the first hemispheric image and at least a portion of the second hemispheric image;
    projecting the spherical image of the scene onto six facets of a cube;
    generating non-hemispheric images of the scene by splitting the spherical image projected onto the six facets of the cube,
    wherein individual ones of the non-hemispheric images of the scene include a portion of the spherical image projected onto the six facets of the cube and are encoded separately, and
    wherein the encoded individual ones are packed into ΔN containers; and
    storing the non-hemispheric images of the scene, wherein the non-hemispheric images of the scene are separately decodable and combinable to provide a spherical view of the scene.

11. The method of claim 10, wherein individual ones of the non-hemispheric images of the scene are stored in separate A/V containers.

12. The method of claim 10, wherein the individual ones of the non-hemispheric images of the scene are stored in separate tracks of a media file.

13. The method of claim 10, wherein the individual ones of the non-hemispheric images of the scene do not overlap.

14. The method of claim 10, wherein at least two of the non-hemispheric images of the scene overlap.

15. The method of claim 10 wherein the spherical image projected onto the six facets of the cube are split into two non-hemispheric images, the individual ones of the two non-hemispheric images including the spherical image projected onto three facets of the cube.

16. The method of claim 10 wherein the spherical image projected onto the six facets of the cube are split into two non-hemispheric images, the individual ones of the two non-hemispheric images including the spherical image projected onto four facets of the cube.

17. The method of claim 10 wherein the spherical image projected onto the six facets of the cube are split into three non-hemispheric images, the individual ones of the three non-hemispheric images including the spherical image projected onto two facets of the cube.

18. The method of claim 10, wherein the spherical image projected onto the six facets of the cube are split such that the individual ones of the non-hemispheric images include the spherical image projected onto at least two continuous facets.

19. A camera apparatus, comprising:
    a first imaging sensor;
    a second imaging sensor;
    processor apparatus; and a non-transitory computer-readable medium in data communication with the processor apparatus and comprising one or more instructions which are configured to, when executed by the processor apparatus, cause the camera apparatus to:
    capture a first hemispheric image of a scene via the first imaging sensor;
    capture a second hemispheric image of the scene via the second imaging sensor;
    generate a spherical image of the scene by stitching at least a portion of the first hemispheric image and at least a portion of the second hemispheric image;
    project the spherical image of the scene onto six facets of a cube;
    generate non-hemispheric images of the scene by splitting the spherical image projected onto the six facets of the cube,
    wherein individual ones of the non-hemispheric images of the scene include a portion of the spherical image projected onto the six facets of the cube and are encoded separately,
    wherein the encoded individual ones are packed into A/V containers, and
    further wherein the spherical image projected onto the six facets of the cube are split such that the individual ones of the non-hemispheric images include the spherical image projected onto at least two continuous facets; and
    store the non-hemispheric images of the scene, wherein the non-hemispheric images of the scene are separately decodable and combinable to provide a spherical view of the scene.

20. The camera apparatus of claim 19, wherein the spherical image projected onto the six facets of the cube are split into two non-hemispheric images, the individual ones of the two non-hemispheric images including the spherical image projected onto three or four facets of the cube.

* * * * *

UNITED STATES PATENT AND TRADEMARK OFFICE
CERTIFICATE OF CORRECTION

| | | |
|---|---|---|
| PATENT NO. | : 11,790,488 B2 | Page 1 of 1 |
| APPLICATION NO. | : 17/332953 | |
| DATED | : October 17, 2023 | |
| INVENTOR(S) | : David Newman et al. | |

It is certified that error appears in the above-identified patent and that said Letters Patent is hereby corrected as shown below:

In the Claims

In Claim 10, Column 23, Line 32, please delete "$\Delta N$" and insert --A/V--, therefor.

Signed and Sealed this
Twenty-first Day of November, 2023

Katherine Kelly Vidal
*Director of the United States Patent and Trademark Office*